United States Patent
Brown et al.

(10) Patent No.: US 8,260,260 B1
(45) Date of Patent: Sep. 4, 2012

(54) VISUAL VOICEMAIL CLIENT AUTHENTICATION

(75) Inventors: Hugh D. Brown, Olathe, KS (US); Sean Patrick Hoelzle, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 465 days.

(21) Appl. No.: 12/510,391

(22) Filed: Jul. 28, 2009

(51) Int. Cl.
*H04M 1/68* (2006.01)
(52) U.S. Cl. ......... 455/411; 455/413; 455/418; 713/168
(58) Field of Classification Search .................. 455/411, 455/413, 418; 713/168
See application file for complete search history.

(56) References Cited

U.S. PATENT DOCUMENTS

| 7,657,254 B2 * | 2/2010 | Jo ................................. 455/413 |
| 2002/0112007 A1 * | 8/2002 | Wood et al. ................... 709/206 |

* cited by examiner

*Primary Examiner* — Danh Le

(57) ABSTRACT

A method, system, and medium are provided for authenticating a visual voicemail client to a visual voicemail server. Visual voicemail enables a user to view a list of voicemail messages and caller information, and select which messages to hear. Currently, a handset accesses visual voicemail using a web interface over a point-to-point network connection with an intermediary gateway. The gateway initiates requests to the voicemail platform on behalf of the handset using a single generic password. There is no direct authentication between the handset client and the voicemail platform. In embodiments of the invention, the handset requests a password from the voicemail platform using the web interface. The voicemail platform sends a password to the handset via a Short Message Service text message, which is an inherently secure means of communication. The handset then uses the password to request voicemail data from the voicemail platform via the web interface.

14 Claims, 3 Drawing Sheets

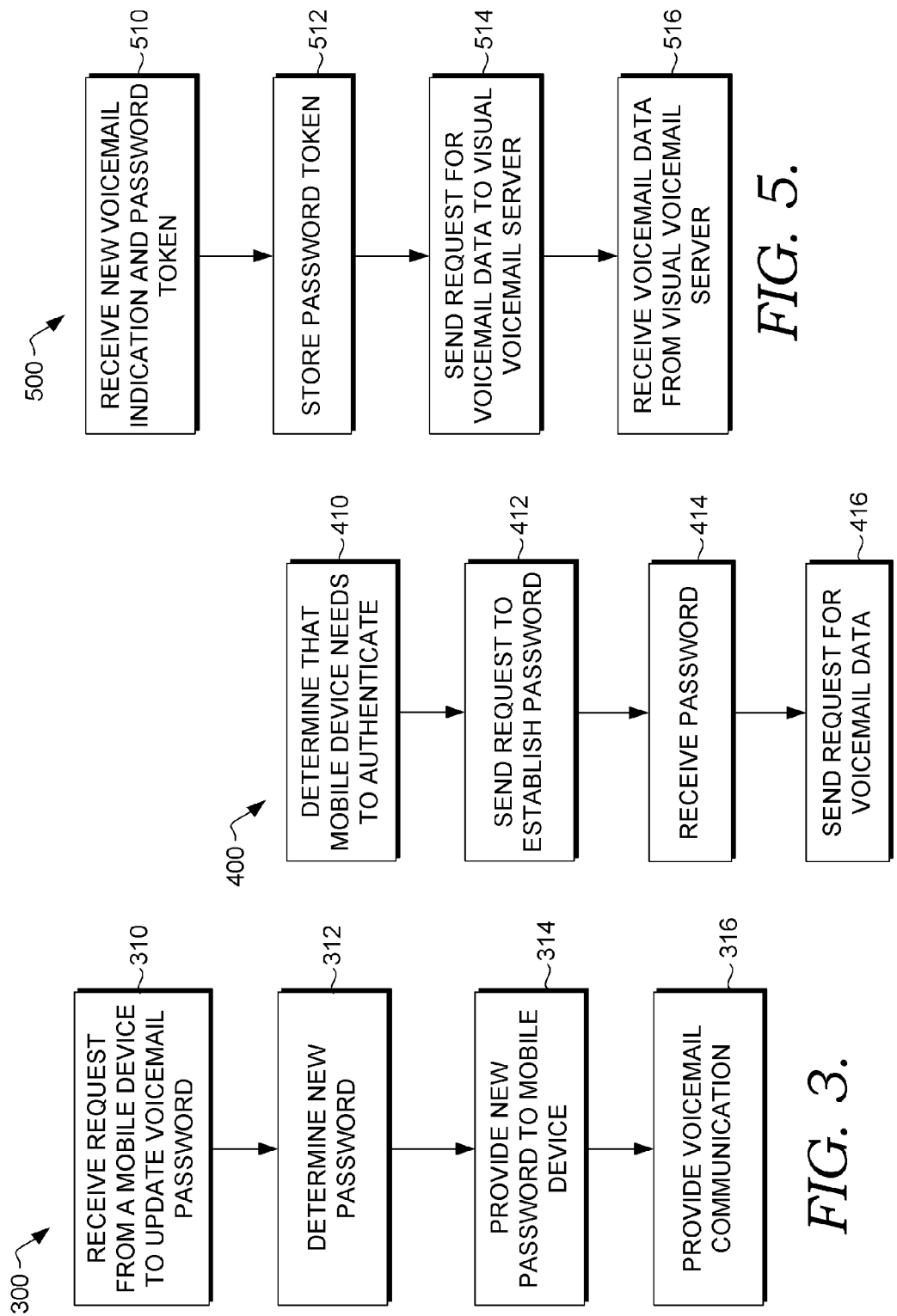

VISUAL VOICEMAIL CLIENT AUTHENTICATION

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In one aspect, a set of computer-useable instructions provide a method of authenticating a request from a mobile device to retrieve data from a visual-voicemail server. The method includes receiving a request from the mobile device to update a voicemail password, determining a new password that will enable the mobile device to retrieve voicemails that are selected from a list of voicemails, and providing the new password to the mobile device through a wireless telecommunications network, where the mobile device has been authenticated to communicate though the wireless telecommunications network, thereby enabling the mobile device to retrieve a voicemail incident to a selection from the list of voicemails.

BRIEF DESCRIPTION OF THE SEVERAL VIEWS OF THE DRAWINGS

Illustrative embodiments of the present invention are described in detail below with reference to the attached drawing figures, and wherein:

FIG. 3 depicts a method of authenticating a request from a mobile device for visual voicemail data in accordance with an embodiment of the present invention;

FIG. 4 depicts a method for a mobile device to request authentication for access to a visual voicemail platform in accordance with an embodiment of the present invention; and FIG. 5 depicts a method for a handset to maintain a password for accessing a visual-voicemail server in accordance with an embodiment of the present invention.

DETAILED DESCRIPTION

Figure 1:
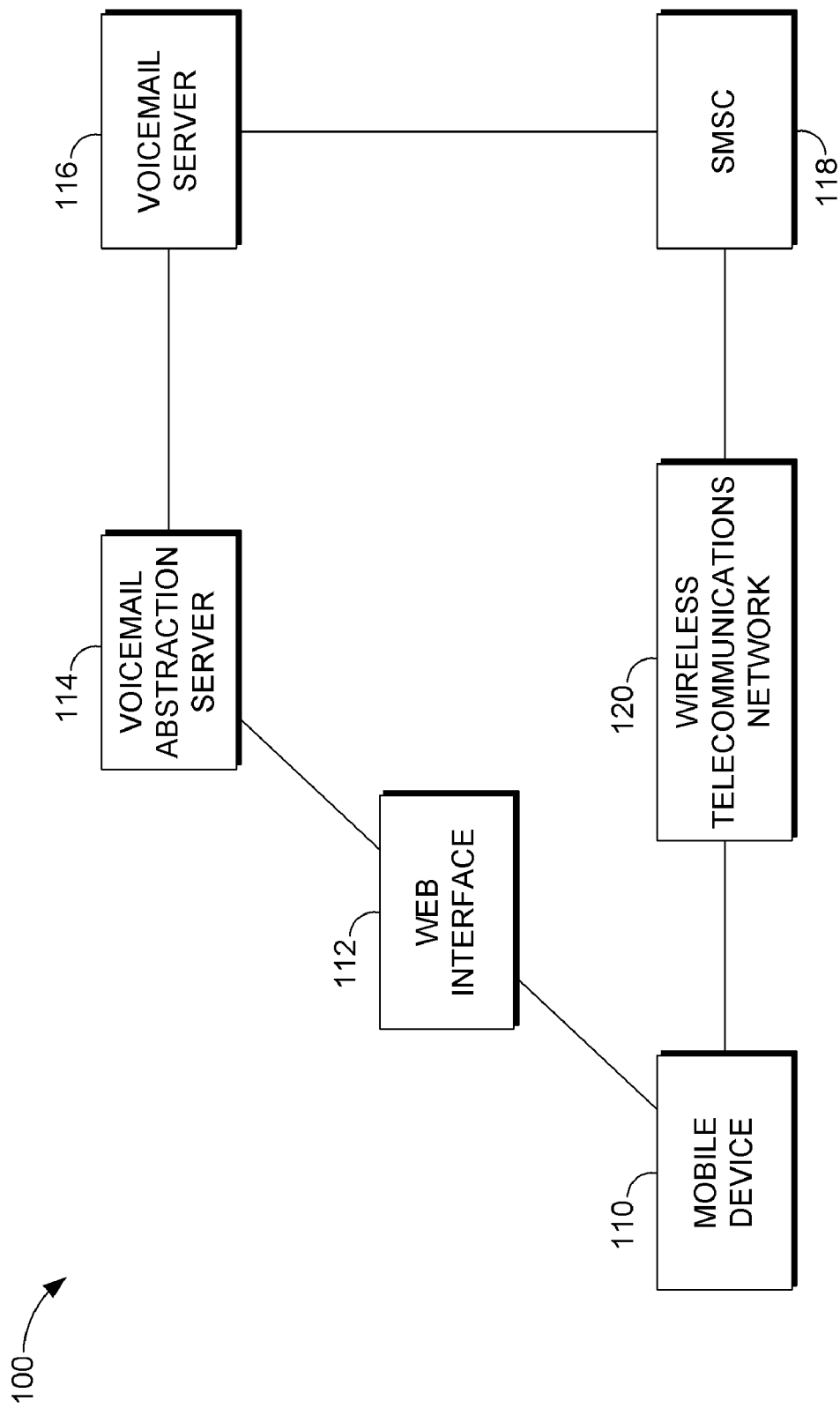
FIG. 1 depicts a system suitable for use in authenticating a visual voicemail client in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD-ROM | Compact-Disk Read-Only Memory |
| DVD | Digital Versatile Disk |
| EEPROM | Electrically-Erasable Programmable Read-Only Memory |
| MDN | Mobile Directory Number |
| MEID | Mobile Equipment Identifier |
| NAI | Network Access Identifier |
| PDA | Personal Data Assistant |
| RAM | Random-Access Memory |
| ROM | Read-Only Memory |
| SMS | Short Message Service |
| SMSC | Short Message Service Center |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

In one embodiment, visual voicemail is utilized to incorporate a visual element into voicemail service. For example, a user can see a list of voicemail messages displayed on his or her handset, as well as information about the callers, without having to listen to the messages. The user can choose which messages to listen to, in any order, or even delete messages, without having to listen to a list of instructions as is the case with regular voicemail.

Embodiments of the present invention enable users to access their voicemail, and prevents users from accessing voicemails that they have not been authorized to access. Currently, when a handset such as a cell phone or personal digital assistant (PDA) accesses visual voicemail, authentication occurs between the handset and an intermediary gateway. For example, when a voicemail gets deposited into a voice mailbox, a voicemail server sends a Short Message Service (SMS) message to the handset notifying it that voicemail is available. The handset makes a point-to-point data connection to the server and is identified by its phone number. Once the connection is established, the handset retrieves the voicemail using a web interface. The intermediary gateway initiates requests to the voicemail platform on behalf of the handset (or visual voicemail client) using a single generic password across a trusted connection. Thus, there is no direct authentication between the handset client and the voicemail platform.

The intermediary gateway tracks the Mobile Equipment Identifier (MEID), which is the identifier unique to the handset; the Mobile Directory Number (MDN), which is the phone number of the handset; and the Network Access Identifier (NAI), which identifies the phone to the network. Those are the three criteria that are used to determine whether a handset is allowed to access voicemail. However, if the user switches phone numbers or handsets, those three criteria no longer match. If the supporting systems aren't updated, the user may be unable to retrieve voicemail.

Embodiments of the present invention allow the handset client to manage authentication directly to the voicemail platform instead of requiring an intelligent gateway to perform this function. The need to track the MEID, MDN and NAI for each handset is eliminated because each handset has its own password by which its voicemail may be accessed.

FIG. 1 depicts an illustrative system for use in authenticating a visual voicemail client in accordance with an embodiment of the present invention generally referred to as a system 100. System 100 is but one example of a suitable system and is not intended to suggest any limitation as to scope of use or functionality. Neither should system 100 be interpreted as having any dependency or requirement relating to any one or combination of components or modules illustrated.

FIG. 1 includes a mobile device 110, a web interface 112, a voicemail-abstraction server 114, a voicemail server 116, a Short Message Service Center (SMSC) 118, and a wireless-telecommunications network 120. One function of mobile device 110 is to access a user's voicemail data. Exemplary mobile devices 110 are a cell phone, a PDA, handset, or other device capable of sending and receiving data over a wireless mobile network. Web interface 112 provides a number of commands for use by mobile device 110 for communicating with voicemail server 114. Voicemail abstraction server 114 translates messages that pass between mobile device 110 and voicemail server 116. Voicemail server 116 maintains voicemail data and communicates with mobile device 110 and SMSC 118. SMSC 118 receives, stores and delivers text messages, and communicates with voicemail server 116 and mobile device 110. Communication between SMSC 118 and mobile device 110 occurs over wireless-telecommunications network 120.

Figure 2:
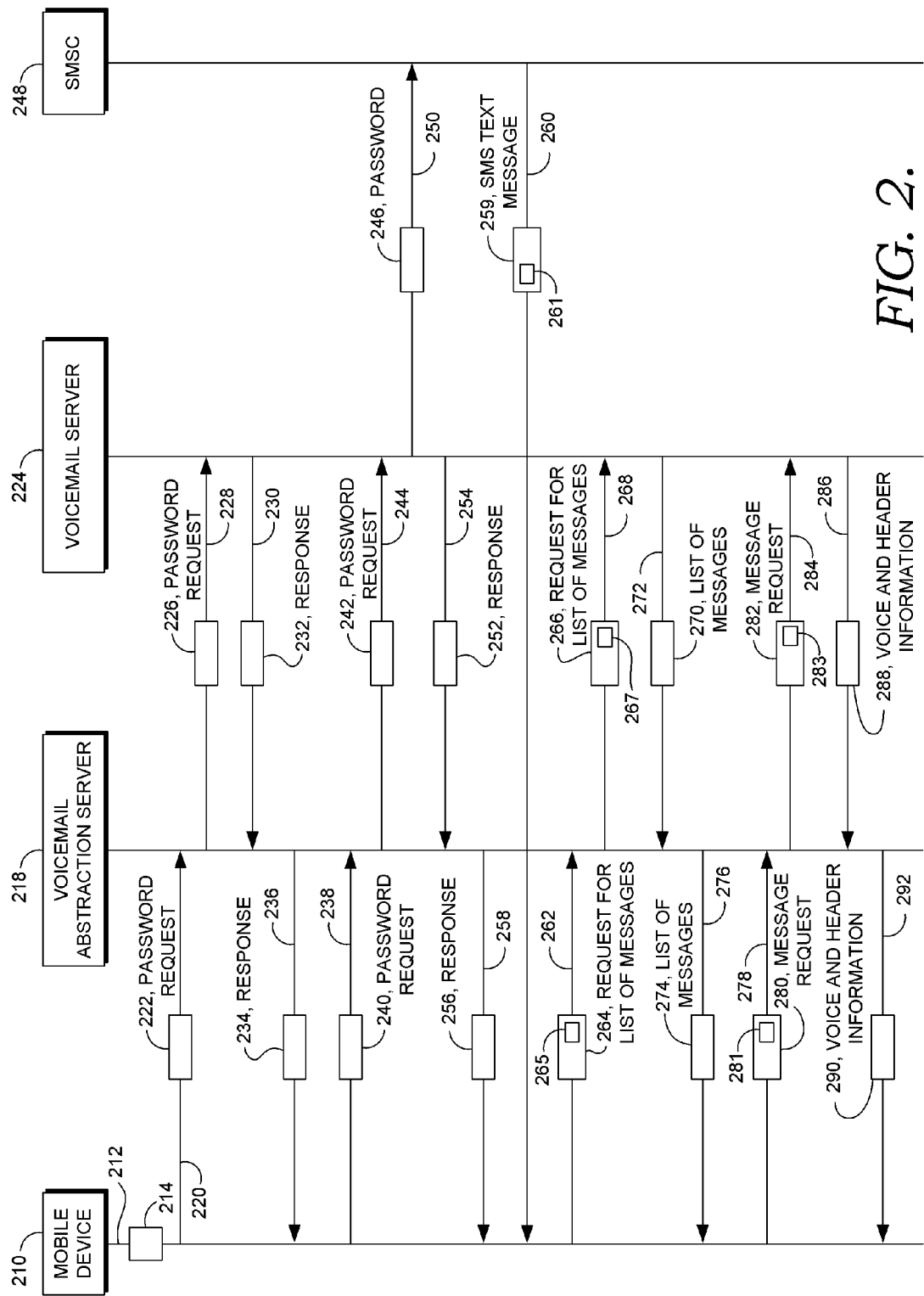
FIG. 2 depicts a method suitable for use in authenticating a visual voicemail client in accordance with an embodiment of the present invention.

Referring to FIG. 2, there is depicted a method for use in authenticating a visual voicemail client in accordance with an embodiment of the present invention generally referred to as a method 200. Method 200 is but one example of a suitable method and is not intended to suggest any limitation as to scope of use or functionality. Neither should method 200 be interpreted as having any dependency or requirement relating to any one or combination of components or modules illustrated.

When a mobile device 210 determines at a step 212 that a new-user tutorial flag 214 is active, it knows that a password must be obtained from a voicemail server 218 to enable the user of mobile device 210 to access his or her voicemail. Voicemail server 218 may be one server, a plurality of servers, or other computing devices that are configured to receive, manage and deliver voicemail data.

In response to determining that the new-user tutorial flag 214 is set, mobile device 210, at a step 220, sends a password request 222 to voicemail server 218. Password request 222 is sent to a default domain over a point-to-point connection. In this example, the default domain is not the domain that will ultimately be associated with the device's voicemail access, because mobile device 210 does not yet know the domain associated with the voicemail access.

Password request 222 is sent using web interface 112. In one embodiment, password request 222 is sent to voicemail abstraction server 218. In other embodiments, password request 222 may be sent directly to voicemail server 224. In some embodiments, voicemail abstraction server 218 may be considered a part of voicemail server 224. The use of voicemail abstraction server 218 allows mobile device 210 to communicate using web interface commands without requiring voicemail server 224 to understand the web interface commands. Thus, voicemail abstraction server 218 acts as a translator between mobile device 210 and voicemail server 224. Voicemail abstraction server 218 translates password request 222 from mobile device 210 to an update-password request 226 that is understood by voicemail server 224, and sends it to voicemail server 224 at a step 228.

At a step 230, voicemail server 224 sends an update-password response 232 to voicemail abstraction server 218, which translates update-password response 232 into a password-request response 234 that is consistent with web interface 112, and sends it to mobile device 210 at a step 236. As discussed above with regard to communication between mobile device 210 and voicemail server 224, in some embodiments response 232 may be sent directly to mobile device 210 without the use of voicemail abstraction server 218. Password-request response 234 does not contain the new password; rather, it contains the correct domain associated with mobile device 210's voicemail access, along with an indication that the password was not updated. Mobile device 210 receives the password-request response and updates the stored default domain with the correct domain.

At a step 238, mobile device 210 sends a password request 240 to the correct domain. The password request is received by voicemail abstraction server 218, translated into an update-password request 242 and sent to voicemail server 224 using the correct domain at a step 244. Voicemail server 224 generates the new password 246 and sends it to SMSC 248 at a step 250, and sends an update-password response 252 to voicemail abstraction server 218 at a step 254, which then sends a password-request response 256 to mobile device 210, at a step 258. Password-request response 256 does not contain the new password 246; rather, it indicates that password 246 was successfully updated.

SMSC 248 sends new password 261, via an SMS text message 259, directly to mobile device 210 at a step 260. The transmission of password 261 to mobile device 210 is inherently secure, due to the nature of an SMS connection, thus voicemail server 224 has the assurance that no other entity is "listening in" or erroneously receiving the communication sent to mobile device 210.

Once mobile device 210 receives password 261, it stores it for use in accessing voicemail. At a step 262, it sends a list-messages request 264 for a list of all messages in the mailbox to voicemail abstraction server 218. The list-messages request includes password 265. Voicemail abstraction server sends a list-messages request 266, including new password 267, to voicemail server 224 at a step 268. Voicemail server 224 verifies password 267 and sends a list of messages 270 to voicemail abstraction server 218 at a step 272, which in turn sends a list of messages 274 to mobile device 210 at a step 276.

Mobile device 210 requests the message voice and header information for a message from the list at a step 278 by sending a get-message request 280, including password 281, to voicemail abstraction server 218. Voicemail abstraction server 218 sends a get-message request 282, including password 283, to voicemail server 224 at a step 284. At a step 286, voicemail server 224 verifies password 283 as being correct and sends message voice and header information 288 to voicemail abstraction server 218, which sends message voice and header information 290 to mobile device 210 at a step 292. Steps 278 through 292 are repeated for each message that is desired to be retrieved by mobile device 210.

Referring now to FIG. 3, there is depicted a method of authenticating a request from a mobile device for visual voicemail data in accordance with an embodiment of the present invention, generally referred to as a method 300. Method 300 is but one example of a suitable method and is not intended to suggest any limitation as to scope of use or functionality. Neither should method 300 be interpreted as having any dependency or requirement relating to any one or combination of components or modules illustrated.

Continuing with FIG. 3, with reference to FIG. 2, at a step 310, a voicemail server 224 receives a request 242 from a mobile device 210 to update a voicemail password. Request 242 is received at step 244 via a Web Services interface. In one embodiment, request 242 is received from mobile device 210 by way of a voicemail abstraction server 218; in other embodiments, request 242 is received directly from mobile device 210. Request 242 to update the voicemail password may be generated for any of a number of reasons. For example, when mobile device 210 is turned on for the first time, or is assigned to a new user, a device initialization may occur that sends the password request 242. Another example is when the user requests a new password. A user may manually request a password, or may direct the mobile device to periodically request a new password based on some interval or other criteria.

Continuing with FIG. 3, at a step 312, voicemail server 224 determines a new password 246 that will enable mobile device 210 to retrieve individual voicemails selected from a list of voicemails presented to the user of mobile device 210. With visual voicemail, as described above, mobile device 210 is enabled to display a list of voicemails from which the user may select.

At a step 314, voicemail server 224 provides new password 246 to mobile device 210 by sending password 246 to an SMSC 248 at a step 250, which in turn sends password 261 to mobile device 210 via an SMS text message 259 at a step 260. Because an SMS message is inherently secure, and is sent directly to mobile device 210's phone number over a wireless telecommunications network, mobile device 210 is inherently authenticated once it receives password 261. Password 261 enables mobile device 210 to access a list of messages from voicemail server 224 by sending a request 264 to voicemail server 224 for the list at step 262. Request 264 includes the password, so when voicemail server 224 receives request 264, it verifies the password and sends a voicemail communication, in this instance the list of messages 270, to mobile device 210 at a step 272, also shown at a step 316. Mobile device 210 may also access individual messages selected from the list by requesting an individual message at a step 278.

Referring now to FIG. 4, there is depicted a method of requesting authentication by a mobile device for access to a visual voicemail platform in accordance with an embodiment of the present invention, generally referred to as a method 400. Method 400 is but one example of a suitable method and is not intended to suggest any limitation as to scope of use or functionality. Neither should method 400 be interpreted as having any dependency or requirement relating to any one or combination of components or modules illustrated.

Continuing with FIG. 4, with reference to FIG. 1, at a step 410 a mobile device 110 determines that it needs to authenticate with a visual-voicemail server 116. The determination may be based on a number of criteria. For example, it may be based on receipt of a request from a user to authenticate mobile device 110, e.g. a request for a new password. Alternately, it may be based on a determination that mobile device 110 is not authenticated; for example, the mobile device 110's stored password may have been corrupted, visual-voicemail server 116 may have lost the device password, or it may be determined that the user of mobile device 110 is a new user and thus needs a new password.

At a step 412, using a Web-Services interface 112, mobile device 110 sends a request to visual-voicemail server 116 to establish a password. The request is communicated over a network point-to-point connection, and may be directed to a voicemail-abstraction server 114 or, in some embodiments, directly to visual-voicemail server 116. Visual voicemail server 116 determines a new password and uses an SMSC 118 to send the new password to mobile device 110 in the form of an SMS text message.

At a step 414, mobile device 110 receives the password from visual-voicemail server through the mobile wireless-telecommunications network 120 via an SMS message. As discussed above, the use of SMS to communicate the password inherently provides a measure of security with regard to the transmission of the password because SMSC 118 communicates directly with mobile device 110, using mobile device 110's phone number.

Once mobile device 210 receives the password, it sends a request at a step 416 to visual-voicemail server 116 for voicemail data such as a list of available messages and actual voicemail audio. Each request for voicemail data includes the password. Authorization to access the voicemail data is granted by visual-voicemail server 116 based on the password accompanying the request.

Referring now to FIG. 5, there is depicted a method of maintaining a password for accessing a visual-voicemail server in accordance with an embodiment of the present invention, generally referred to as a method 500. Method 500 is but one example of a suitable method and is not intended to suggest any limitation as to scope of use or functionality. Neither should method 500 be interpreted as having any dependency or requirement relating to any one or combination of components or modules illustrated.

Continuing with FIG. 5, at a step 510 a handset 210 (a mobile device) receives an indication from a visual-voicemail server 224, via an SMS text message 259, that new voicemail 288 is available. The SMS text message 259 also includes a new password token 261. Password token 261 may be provided to handset 210 in response to a request 222 from the handset to modify a password. For example, a user may opt to occasionally request new password 261 as a security measure. Alternately, if a user changes phone numbers, or buys a new handset 210 having a different MEID, a new password 261 may be required.

At a step 512, handset 210 stores password token 261. When time handset 210 requests voicemail data from visual-voicemail server 224, it will use password token 261 to provide security credentials 265.

At a step 514, handset 210 sends a request 264 for voicemail data to visual-voicemail server 224, including security credentials 265. Request 264 is sent over a point-to-point data connection using a web-services interface. Voicemail data 274 is received by handset 210 over the point-to-point connection, using the web-services interface, at a step 516.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed, cause a voicemail server to perform a method of authenticating a request to retrieve data received from a mobile device that conveys visual attributes of a voicemail message, the method comprising:
   receiving at said voicemail server a request from said mobile device to update a voicemail password, wherein said request is received by way of a point-to-point data connection;
   in response to receiving said request, generating a new password that will enable said mobile device to retrieve voicemails that are selected from a list of voicemails;
   communicating said new password to said mobile device through a mobile wireless telecommunications network, said mobile device having been authenticated to communicate though said mobile wireless telecommunications network, thereby enabling said mobile device to retrieve a voicemail incident to a selection from said list.

2. The media of claim 1, wherein said request is received via a web-services interface.

3. The media of claim 2, wherein providing said new password includes sending said new password to said mobile device via a Short Message Service (SMS).

4. The media of claim 3, wherein said request is received as a result of an initialization of said mobile device.

5. The media of claim 3, wherein said request is received as a result of an update-password request by a user of said mobile device.

6. The media of claim 1, further comprising providing a voicemail communication incident to receiving said new password from said mobile device.

7. One or more nontransitory computer-readable media having computer-executable instructions embodied thereon that, when executed, cause a voicemail server to perform a method of authenticating a request to retrieve data received from a mobile device that conveys visual attributes of a voicemail message, the method comprising:
   receiving at said voicemail server a request from said mobile device to update a voicemail password wherein said request is received via a web-services interface, wherein said request is received periodically based on an interval selected by a user of said mobile device;
   determining a new password that will enable said mobile device to retrieve voicemails that are selected from a list of voicemails;
   providing said new password to said mobile device through a wireless telecommunications network, wherein providing said new password includes sending said new password to said mobile device via a Short Message Service (SMS) said mobile device having been authenticated to communicate though said wireless telecommunications network, thereby enabling said mobile device to retrieve a voicemail incident to a selection from said list.

8. One or more nontransitory computer-readable media having computer-executable instructions embodied thereon that, when executed, cause a mobile device to perform a method of requesting authentication for access to a visual-voicemail server, the method comprising:
   at said mobile device, determining that said mobile device needs to authenticate with said visual-voicemail server;
   sending to said visual voicemail server a request to establish a new password that, when provided, authorizes said mobile device to access voicemail data that resides on said visual-voicemail server; and
   at said mobile device, receiving said new password from said visual-voicemail server through a wireless-telecommunications network, thereby enabling a request for said voicemail data to be authenticated at said visual-voicemail server.

9. The media of claim 8, wherein said request to establish said password is communicated from said mobile device using a web-services interface.

10. The media of claim 9, wherein said password is received via a Short Message Service (SMS).

11. The media of claim 10, further comprising sending a request for said voicemail data.

12. The media of claim 11, wherein sending said request for voicemail data includes communicating with a voicemail-abstraction server.

13. The media of claim 8, wherein determining that said mobile device needs to authenticate includes receiving a user request to authenticate said mobile device.

14. The media of claim 8, wherein determining that said mobile device needs to authenticate includes determining one or more of the following:
   that said mobile device is not authenticated; and
   that a user of said mobile device is a new user.

* * * * *